United States Patent
Nakayashiki et al.

(10) Patent No.: US 12,542,456 B2
(45) Date of Patent: Feb. 3, 2026

(54) WIRELESS POWER TRANSFER APPARATUS

(71) Applicant: DENSO CORPORATION, Kariya (JP)

(72) Inventors: Yuusei Nakayashiki, Kariya (JP);
Masaya Takahashi, Kariya (JP);
Eisuke Takahashi, Kariya (JP);
Nobuhisa Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 799 days.

(21) Appl. No.: 17/842,992

(22) Filed: Jun. 17, 2022

(65) Prior Publication Data

US 2022/0320909 A1    Oct. 6, 2022

Related U.S. Application Data

(63) Continuation of application No. PCT/JP2020/045200, filed on Dec. 4, 2020.

(30) Foreign Application Priority Data

Dec. 17, 2019   (JP) ................. 2019-227044

(51) Int. Cl.
| | |
|---|---|
| *H02J 7/04* | (2006.01) |
| *H01F 38/14* | (2006.01) |
| *H02J 50/12* | (2016.01) |
| *H02J 50/40* | (2016.01) |
| *H02J 50/70* | (2016.01) |

(52) U.S. Cl.
CPC ............. *H02J 50/12* (2016.02); *H01F 38/14* (2013.01); *H02J 50/402* (2020.01); *H02J 50/70* (2016.02); *H01F 2038/146* (2013.01)

(58) Field of Classification Search
None
See application file for complete search history.

(56) References Cited

U.S. PATENT DOCUMENTS

| | | | |
|---|---|---|---|
| 9,680,311 B2 | 6/2017 | Blood et al. | |
| 2007/0080668 A1* | 4/2007 | Al-Anbuky | H01M 10/42 320/136 |
| 2009/0074011 A1 | 3/2009 | Okado | |
| 2013/0033118 A1* | 2/2013 | Karalis | B60L 53/126 307/104 |
| 2015/0362614 A1 | 12/2015 | Obayashi et al. | |

FOREIGN PATENT DOCUMENTS

| | | |
|---|---|---|
| GB | 2440571 A | 2/2008 |
| JP | 2019-71719 A | 5/2019 |
| WO | 2013/051361 A1 | 4/2013 |

\* cited by examiner

*Primary Examiner* — Arun C Williams
(74) *Attorney, Agent, or Firm* — Oliff PLC

(57) ABSTRACT

In a wireless power transfer apparatus, a characteristic adjuster has a frequency characteristic that causes, in a power transfer mode from at least one power transmission unit to a power receiving apparatus, a resonant power transmission circuit to have a resonance frequency that substantially matches an operating frequency. The reactance of a power transmission coil has a reference value in the power transfer mode. The frequency characteristic of the characteristic adjuster causes, in a power non-transfer mode from the at least one power transmission unit to the power receiving apparatus, a reactance of a power transmission coil to become an adjusted value that is higher than the reference value.

10 Claims, 8 Drawing Sheets

WIRELESS POWER TRANSFER APPARATUS

CROSS-REFERENCE TO RELATED APPLICATION

The present application is a bypass continuation application of a currently pending international application No. PCT/JP2020/045200 filed on Dec. 4, 2020 designating the United States of America, the entire disclosure of which is incorporated herein by reference, the internal application being based on and claiming the benefit of priority of Japanese Patent Application No. 2019-227044 filed on Dec. 17, 2019. The disclosure of the Japanese Patent Application No. 2019-227044 is incorporated in its entirety herein by reference.

TECHNICAL FIELD

The present disclosure relates to wireless power transfer apparatuses.

BACKGROUND

A wireless power transfer system includes a high-frequency power source, power transmission coils, and current control elements connected in series to the respective power transmission coils; each of the current control elements is located between the high-frequency power source and a corresponding one of the power transmission coils.

SUMMARY

A characteristic adjuster a wireless power transfer apparatus according to one aspect of the present disclosure has a frequency characteristic that causes, in a power transfer mode from at least one power transmission unit to a power receiving apparatus, a resonant power transmission circuit to have a resonance frequency that substantially matches an operating frequency. The reactance of a power transmission coil has a reference value in the power transfer mode. The frequency characteristic of the characteristic adjuster causes, in a power non-transfer mode from the at least one power transmission unit to the power receiving apparatus, the reactance of the power transmission coil to become an adjusted value that is higher than the reference value.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENTS

Figure 1:
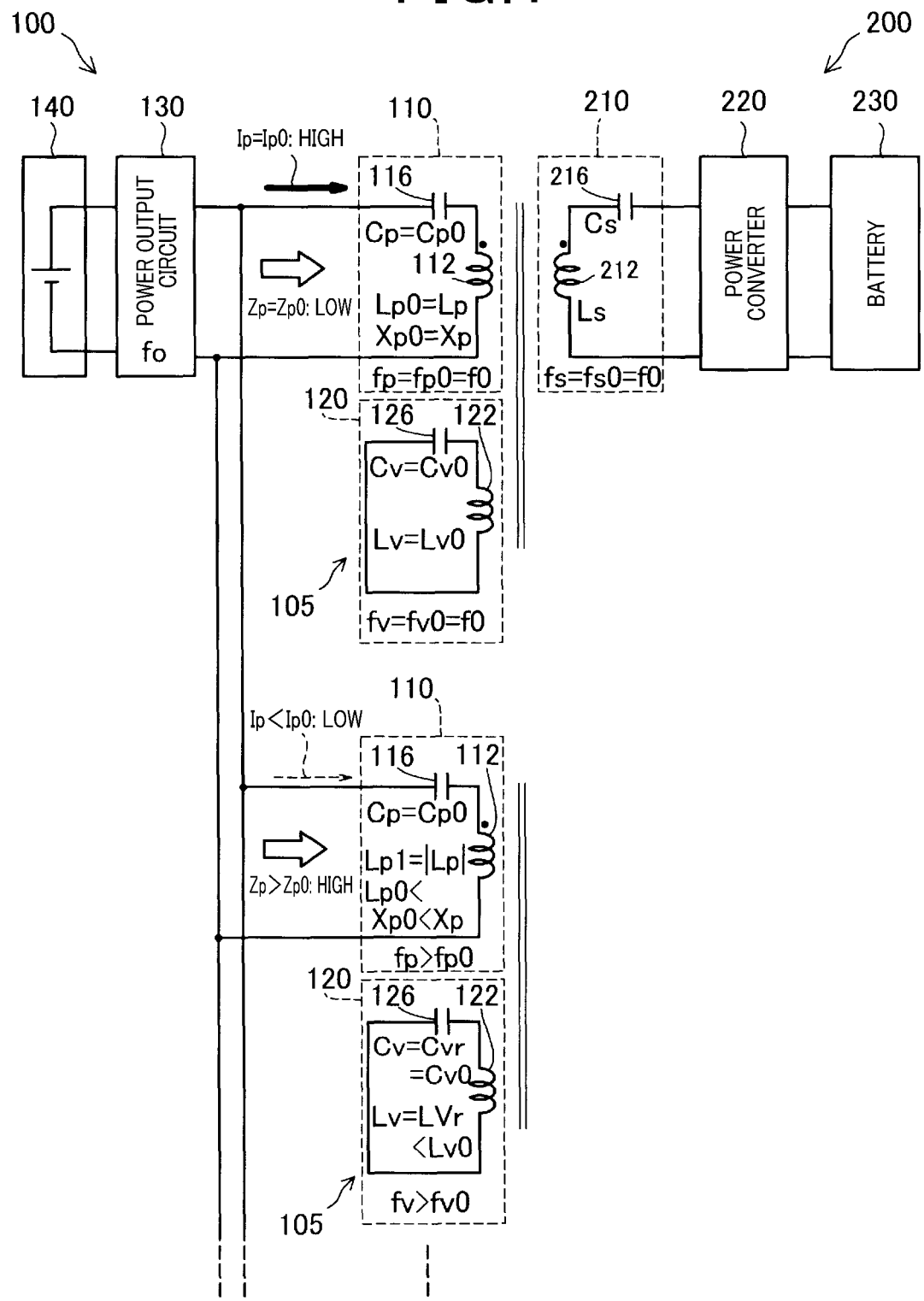
FIG. 1 is a circuit diagram of a wireless power transfer apparatus according to the first embodiment.

Japanese Patent Application Publication No. 2019-71719 discloses a wireless power transfer system that includes a high-frequency power source, power transmission coils, and current control elements connected in series to the respective power transmission coils; each of the current control elements is located between the high-frequency power source and a corresponding one of the power transmission coils.

As each current control element, a variable impedance element, such as a saturable inductor, is used. Each variable impedance element has a variable impedance that rises when the level of a current flowing therethrough from the high-frequency power source to the corresponding power transmission coil is lower than a threshold level, and falls when the level of the current flowing therethrough from the high-frequency power source to the corresponding power transmission coil is higher than or equal to the threshold level.

This causes the impedance of at least one current control element connected in series to at least one standby power transmission coil, which does not contribute to wireless power transmission to at least one power receiving coil located to face the at least one power transmission coil, to rise, thus restricting power supply from the high-frequency power source to the at least one standby power transmission coil.

The above available technology, which uses current control elements each connected in series to the corresponding one of power transmission coils, cannot be applied to series-resonant power transmission circuits, each of which includes a power transmission coil and a resonant power transmission capacitor connected in series to the power transmission coil. This may result in the above available technology having less versatility.

If the above available technology is applied to resonant power transmission circuits, a reactance component of each current control element may result in a negative impact on the resonant characteristic of the corresponding resonant power transmission circuit, resulting in a reduction in the power transmission characteristic of the corresponding resonant power transmission circuit.

Saturable inductors, which are used as an example of the current control elements in the above available technology, need to have a higher inductance for a higher impedance thereof. These saturable inductors therefore may have a larger size when used as the current control elements.

One exemplary aspect of the present disclosure offers a wireless power transfer apparatus for wirelessly transferring electrical power to a power receiving apparatus. The wireless power transfer apparatus includes a power output circuit configured to output alternating-current power having a predetermined operating frequency, and at least one power transmission unit configured to transmit the alternating-current power to the power receiving apparatus. The at least one power transmission unit includes a resonant power transmission circuit that includes a power transmission coil having a reactance, and a resonant capacitor. The at least one power transmission unit includes at least one characteristic adjuster configured as a closed loop that includes a characteristic adjustment coil magnetically coupled to the power transmission coil, and a characteristic adjustment capacitor connected to the characteristic adjustment coil.

The at least one characteristic adjuster has a frequency characteristic that causes, in a power transfer mode from the at least one power transmission unit to the power receiving apparatus, the resonant power transmission circuit to have a resonance frequency that substantially matches the operating frequency. The reactance of the power transmission coil has a reference value in the power transfer mode. The frequency characteristic of the at least one characteristic adjuster causes, in a power non-transfer mode from the at least one power transmission unit to the power receiving apparatus, the reactance of the power transmission coil to become an adjusted value that is higher than the reference value.

The wireless power transfer apparatus enables the reactance of the power transmission coil in the power non-transfer mode to become the adjusted value that is higher than the reference value of the reactance of the power transmission coil in the power transfer mode. This enables a current from the power output circuit to the at least one power transmission unit to be restricted in the power non-transfer mode as compared with that in the power transfer mode. This results in a reduction in unnecessary power consumption by the power transmission coil in the power non-transfer mode and a reduction in leakage magnetic flux.

Additionally, the wireless power transfer apparatus controls, without using a conventional current control element connected in series to the power transmission coil, both (i) the transfer of a current from the power output circuit to the at least one power transmission unit in the power transfer mode and (ii) the restriction of a current from the power output circuit to the at least one power transmission unit in the power non-transfer mode.

Accordingly, the exemplary aspect of the present disclosure makes it possible to offer the above technologies, which have more general applicability.

First Embodiment

FIG. 1 illustrates the configuration of a wireless power transfer apparatus 100 according to the first embodiment, which enables wireless power transfer to a power receiving apparatus 200.

The wireless power transfer apparatus 100 includes a power supply circuit 140, a power output circuit 130, and a plurality of power transmission units 105, in other words, first to Nth (N is an integer more than or equal to 2) power transmission units 105, connected in parallel to the power output circuit 130. Each power transmission unit 105 includes a resonant power transmission circuit 110 and a characteristic adjuster 120. The resonant power transmission circuits 110 of the respective power transmission units 105 are connected in parallel to the power output circuit 130.

Each resonant power transmission circuit 110 is operable to perform power transfer to the power receiving circuit 200 using resonance. Specifically, each resonant power transmission circuit 110 includes, for example, a power transmission coil 112 and a resonant capacitor 116 connected in series to the power transmission coil 112.

The power output circuit 130 is configured to convert direct-current (DC) power supplied from the power supply circuit 140 into alternating-current (AC) power having a predetermined operating frequency, and transfer the converted AC power to each resonant power transmission circuit 110. The power output circuit 130 is configured as, for example, an inverter.

The power supply circuit 140 is configured as, for example, an AC/DC converter configured to rectify an AC voltage of an external power source into a DC voltage, and supply the DC voltage as the DC power to the power output circuit 130.

Each power transmission coil 112 has a coil face surrounded by a looped wire constituting the corresponding power transmission coil 112; the coil face of each power transmission coil 112 serves as a face that outputs magnetic flux proportional to the amount of current flowing through the corresponding power transmission coil 112.

The power transmission coils 112 of the respective resonant power transmission circuits 110 are arranged such that their coil faces are in line with a horizontal direction.

The characteristic adjuster 120 included in each power transmission unit 105, which is paired with the resonant power transmission circuit 110 included in the corresponding power transmission unit 105, is configured as a closed loop comprised of a characteristic adjustment coil 122 and a characteristic adjustment capacitor 126 connected in series to the characteristic adjustment coil 122.

Figure 2:
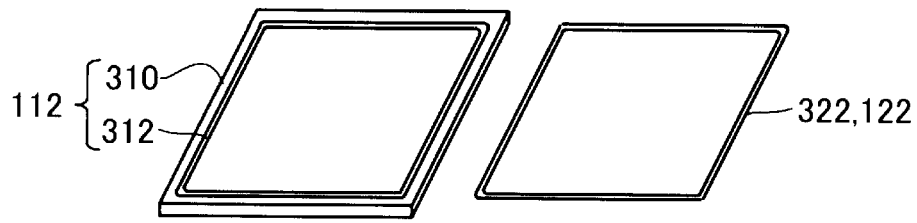
FIG. 2 is a view illustrating an example of the arrangement of a power transmission coil and a paired characteristic adjustment coil.

The characteristic adjustment coil 122 of the characteristic adjuster 120 is, as illustrated in FIG. 2, arranged adjacently at one side of the power transmission coil 112 of the paired resonant power transmission circuit 110 while their coil faces are aligned with one another, so that the characteristic adjustment coil 122 and the power transmission coil 112 are magnetically coupled to each other. FIG. 1 shows the magnetically coupled state between the power transmission coil 112 and the characteristic adjustment coil 122 included in each power transmission unit 105 by two parallel lines located adjacent to the power transmission coil 112 and the characteristic adjustment coil 122.

The arrangement of the characteristic adjustment coil 122 of the characteristic adjuster 120 is not limited to that illustrated in FIG. 2. Specifically, the characteristic adjustment coil 122 of the characteristic adjuster 120 can be arranged adjacently at the other side of the power transmission coil 112 of the paired resonant power transmission circuit 110 while their coil faces are aligned with one another. The characteristic adjustment coil 122 of the characteristic adjuster 120 can be arranged adjacently over the coil face of the power transmission coil 112 of the paired resonant power transmission circuit 110. That is, the characteristic adjustment coil 122 of the characteristic adjuster 120 can be freely arranged as long as the characteristic adjustment coil 122 is magnetically coupled to the power transmission coil 112 of the paired resonant power transmission circuit 110.

The magnetically coupled state between each pair of power transmission coil 112 and characteristic adjustment coil 122 can be represented as a coupling coefficient, i.e., a coupling factor, therebetween. That is, if the magnetically coupled state between a selected first pair of power transmission coil 112 and characteristic adjustment coil 122 is different from that between a selected second pair of power transmission coil 112 and characteristic adjustment coil 122, a value of the coupling coefficient between the selected first pair of power transmission coil 112 and characteristic adjustment coil 122 is different from that between the selected second pair of power transmission coil 112 and characteristic adjustment coil 122. The coupling coefficient between each pair of power transmission coil 112 and characteristic adjustment coil 122 can take any value within the range from −1 to +1 inclusive depending on how the characteristic adjustment coil 122 is arranged with respect to the paired power transmission coil 112.

As an example, the power transmission coil 112 is, as illustrated in FIG. 2, designed as a core-type coil comprised of a core 310 and a wire 312 looped around the core 310. As an example, the characteristic adjustment coil 122 is, as illustrated in FIG. 2, designed as a coreless-type coil comprised of a looped wire 322. The characteristic adjustment coil 122 can be designed as a core-type coil, which is similar to the core-type power transmission coil 112.

The power receiving apparatus 200 is installed in one of various apparatuses, such as electronic devices or electric vehicles, which operate based on electrical power. The power receiving apparatus 200 includes a resonant power receiving circuit 210, a power converter 220, and a battery 230.

The resonant power receiving circuit 210 includes, like the resonant power transmission circuit 110, a power receiving coil 212 and a resonant capacitor 216 connected in series to the power receiving coil 212.

That is, the first embodiment employs a primary and secondary series-series (SS) resonant capacitor system as the system of the resonant power transmission circuits 110 and the resonant power receiving circuit 210. Additionally, the first embodiment employs a single-phase to single-phase wireless power transfer system using the single-phase power transmission coils 112 and the single-phase power receiving coil 212.

The power receiving coil 212 of the resonant power receiving circuit 210 is configured to magnetically resonate at a predetermined resonance frequency of at least one power transmission coil 112 of at least one power transmission circuit 110 so that the power receiving coil 212 and the at least one power transmission coil 112 provide magnetic resonant coupling therebetween, making it possible for the resonant power receiving circuit 210 to obtain AC power induced across the power receiving coil 212 in the magnetic resonant coupling.

The power converter circuit 220 is configured to convert the AC power obtained by the resonant power receiving circuit 210 into DC power, and charge the battery 230 using the DC power. The apparatus, which has installed therein the power receiving apparatus 200, uses the DC power charged in the battery 230 as electrical power.

FIG. 1 illustrates, as an example, the coil face of the power receiving coil 212 of the power receiving apparatus 200 located over the coil face of the power transmission coil 112 of the first power transmission unit 105. This results in the power receiving coil 212 being magnetically coupled to the power transmission coil, i.e., the first power transmission coil, 112 and the characteristic adjustment coil 122 of the first power transmission unit 105; the characteristic adjustment coil 122 is magnetically coupled to the first power transmission coil 112.

Each power transmission unit 105 has an input impedance Zp, and the input impedance Zp of the first power transmission unit 105 over which the power receiving coil 212 is located becomes a relatively low value Zp0. This results in a drive current, which has a relatively high level Ip0, being supplied from the power output circuit 130 to the first power transmission coil 112 as an output current Ip having an operating frequency f0; the drive current having the level Ip0 will be referred to as a drive current Ip0. That is, the magnetic resonant coupling between the first power transmission coil 112 and the power receiving coil 212 induces a current having the same operating frequency f0 and flowing through the power receiving coil 212. That is, the magnetic resonant coupling between the first power transmission coil 112 and the power receiving coil 212 enables electrical power, i.e., the induced current having the operating frequency f0, to be transmitted from the resonant power transmission circuit 110 to the power receiving apparatus 200 through the resonant power receiving circuit 110.

In contrast, the input impedance Zp of each of the remaining second to Nth power transmission units 105 over which no power receiving coil 212 is located becomes a value higher than the relatively low value Zp0 of the input impedance Zp of the first power transmission unit 105. This results in a restricted current, which has a level lower than the relatively high level Ip0, merely flowing through the first power transmission coil 112 as the output current Ip. This results in a reduction in unnecessary power consumption by the resonant power transmission circuit 110 of each of the remaining second to Nth power transmission units 105 over which no power receiving coil 212 is located, a reduction in leakage magnetic flux, and an improvement of the power transfer efficiency.

Each power transmission coil 112 has an inductance Lp, and the inductance Lp of each power transmission coil 112 varies depending on whether the characteristic adjuster 120 is paired with the corresponding power transmission coil 112, that is, whether magnetic resonant coupling is generated between the characteristic adjustment coil 122 and the corresponding power transmission coil 112.

Figure 3:
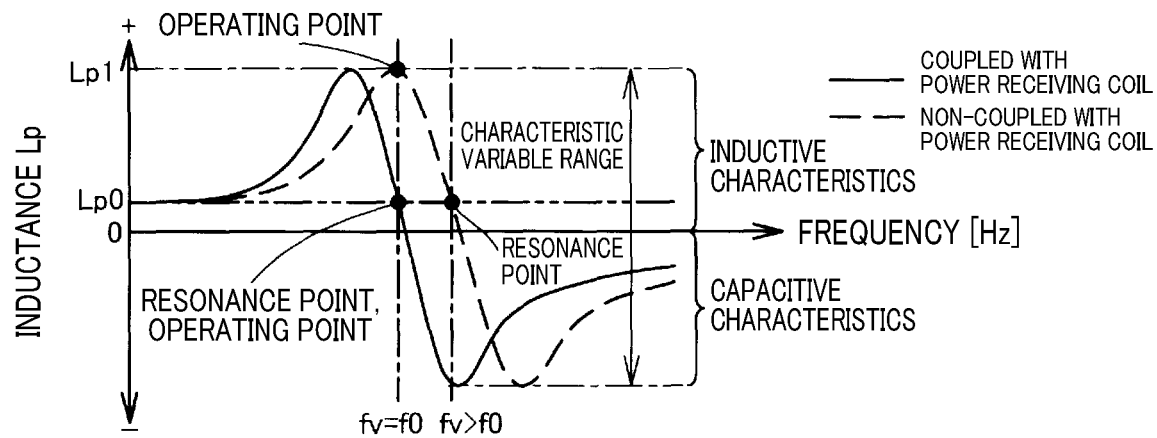
FIG. 3 is a graph illustrating frequency characteristic curves of the power transmission coil.

The inductance Lp of the power transmission coil 112 becomes a constant value Lp0 as illustrated by chain double-dashed line in FIG. 3 if no characteristic adjuster 120 is provided to be paired with the power transmission coil 112. In contrast, the inductance Lp of the power transmission coil 112 varies with frequency as illustrated by a solid curve and a dashed curve in FIG. 3 if the characteristic adjuster 120 is provided to be paired with the power transmission coil 112.

The frequency characteristics of the inductance Lp of the power transmission coil 112 are based on the frequency characteristics of the impedance of the characteristic adjuster 120, and show inductive characteristics within a low frequency range that is lower than a resonance frequency fv, and capacitive characteristics within a high frequency range that is higher than the resonance frequency fv.

Additionally, the characteristic adjustment coil 122 of the characteristic adjuster 120 of each power transmission unit 105 has an inductance Lv, and the inductance Lv of each characteristic adjustment coil 122 varies depending on whether the power receiving coil 212 is located over the corresponding power transmission unit 105, that is, whether magnetic coupling is generated between the power receiving coil 212 and the corresponding characteristic adjustment coil 122.

Specifically, the inductance Lv of the characteristic adjustment coil 122 of the first power transmission unit 105 over which the power receiving coil 212 is located becomes higher than that over which no power receiving coil 212 is located. This causes the resonance frequency fv of the characteristic adjuster 120 of the first power transmission unit 105 over which the power receiving coil 212 is located to become lower than that over which no power receiving coil 212 is located.

This results in the frequency characteristic curve of the inductance Lp of each power transmission coil 112 if the power receiving coil 212 is located over the corresponding power transmission coil 112 being shifted to the low frequency side as compared with that if no power receiving coil 212 is located over the corresponding power transmission coil 112.

From the above viewpoints, each of the resonant power transmission circuits 110 and characteristic adjustment circuits 120, which has circuit constants, according to the first embodiment is configured such that the circuit constants of the corresponding one of the resonant power transmission circuits 110 and characteristic adjustment circuits 120 are individually set to respective adjusted values.

First, a reference value of the inductance Lp of the power transmission coil 112 and a reference value of a capacitance Cp of the resonant capacitor 116 of each resonant power transmission circuit 110 with which no characteristic adjuster 120 is paired are respectively set to values that enable the resonance frequency of the corresponding resonant power transmission circuit 110 to become one of frequency values that substantially match the operating frequency f0. The frequency values that substantially match the operating frequency f0, can include (i) A frequency value that exactly matches the operating frequency f0

(ii) Frequency values that are close to the operating frequency f0 and can be safely regarded as the operating frequency f0

The reference value of the inductance Lp of the power transmission coil 112 of each resonant power transmission circuit 110 according to the first embodiment is set to a value Lp0, and the reference value of the capacitance Cp of the resonant capacitor 116 of each resonant power transmission circuit 110 according to the first embodiment is set to a value Cp0. A reactance Xp of each power transmission coil 112 at the operating frequency f0 according to the first embodiment is set to a value Xp0.

Similarly, a value of the inductance Ls of the power receiving coil 212 and a value of a capacitance Cs of the resonant capacitor 216 of the resonant power receiving circuit 210 are respectively set to values that enable the resonance frequency of the resonant power receiving circuit 210 to become one of frequency values that substantially match the operating frequency f0.

Next, the following describes how a value of the inductance Lv of the characteristic adjustment coil 122 and a value of the capacitance Cv of the characteristic adjustment capacitor 126 of each characteristic adjuster 120 are set.

Specifically, the inductance Lv of the characteristic adjustment coil 122 and the capacitance Cv of the characteristic adjustment capacitor 126 of each characteristic adjuster 120 are respectively set to values that enable the inductance Lp of the paired power transmission coil 112 to vary between a first frequency-characteristic curve illustrated by the solid line in FIG. 3 and a second frequency-characteristic curve illustrated by the dashed line in FIG. 3 depending on whether the characteristic adjustment coil 122 is magnetically coupled to the power receiving coil 212. A reference value of the inductance Lv of the characteristic adjustment coil 122 and a reference value of the capacitance Cv of the characteristic adjustment capacitor 126 of each characteristic adjuster 120 respectively represent a value of the inductance Lv of the characteristic adjustment coil 122 and a value of the capacitance Cv of the characteristic adjustment capacitor 126 while the characteristic adjustment coil 122 is not magnetically coupled to the power receiving coil 212.

The reference value of the inductance Lv of the characteristic adjustment coil 122 of each characteristic adjuster 120 according to the first embodiment is set to a value Lvr and the reference value of the capacitance Cv of the characteristic adjustment capacitor 126 of each characteristic adjuster 120 according to the first embodiment is set to a value Cvr. If the inductance Lv of the characteristic adjustment coil 122 and the capacitance Cv of the characteristic adjustment capacitor 126 are respectively set to the reference values Lvr and Cvr, the resonance frequency fv of the characteristic adjuster 120 is set to be higher than a predetermined frequency fv0 that substantially matches the operating frequency f0.

The reference value Cvr of the capacitance Cv of the characteristic adjustment capacitor 126 is set to a capacitance value Cv0 that enables the resonance frequency fv of the characteristic adjuster 120 to be set to a value fv0 that substantially matches the operating frequency f0; the resonance frequency fv of the characteristic adjuster 120 is determined based on a value Lv0 of the inductance Lv of the characteristic adjustment coil 122 and a value of the capacitance Cv of the characteristic adjustment capacitor 126.

The inductance Lv of the characteristic adjustment coil 122 with the power receiving coil 212 being magnetically coupled to the characteristic adjustment coil 122 varies, based on the magnetically coupling state between the coils 122 and 212, to be higher than the reference value Lvr; the reference value Lvr of the inductance Lv of the characteristic adjustment inductor 122 enables the resonance frequency fv of the characteristic adjuster 120 to be set to the value fv0 that substantially matches the operating frequency f0.

A value of the inductance Lv of the characteristic adjustment coil 122 with the power receiving coil 212 being magnetically coupled to the characteristic adjustment coil 122 is represented as Lv0 according to the first embodiment. In other words, the reference value Lvr of the inductance Lv of the characteristic adjustment coil 122 with the power receiving coil 212 being not magnetically coupled to the characteristic adjustment coil 122 is set to be lower than the reference value Lv0 of the inductance Lv of the characteristic adjustment coil 122 with the power receiving coil 212 being magnetically coupled to the characteristic adjustment coil 122.

The following describes how the resonant power transmission circuit 110 of each power transmission unit 105 works when the circuit constants of each of the resonant power transmission circuits 110 and characteristic adjusters 120 are set as described above.

The inductance Lp of the first power transmission coil 112 of the first power transmission unit 105 over which the power receiving coil 212 is located (see FIG. 1) becomes, as illustrated by the solid curve in FIG. 3, the reference value Lp0 corresponding to the resonance frequency fp, i.e., the resonance point, of the resonant power transmission circuit 110. This causes the resonance frequency fp of the resonant power transmission circuit 110 including the first power transmission coil 112 to become a value fp0 that substantially matches the operating frequency f0.

This results in, as illustrated in FIG. 1, the input impedance Zp of the resonant power transmission circuit 110 at an operating point, i.e., the operating frequency f0, becoming the relatively low value Zp0. The relatively low value Zp0 of the input impedance Zp enables the drive current Ip0 at the operating frequency f0, which has the relatively high level Ip0, to be supplied as the output current Ip from the power output circuit 130 to the first power transmission coil 112. This therefore makes it possible to transmit, to the power receiving apparatus 200 through the resonant power receiving circuit 210, electrical power from the resonant power transmission circuit 110 of the first power transmission unit 105 having the first power transmission coil 112 over which the power receiving coil 212 is located.

In contrast, the inductance Lp of the power transmission coil 112 of each of the second to Nth power transmission units 105 over which no power receiving coil 212 is located becomes, as illustrated by the dashed curve in FIG. 3, the reference value Lp0 corresponding to the resonance frequency fv, i.e., the resonance point, of the resonant power transmission circuit 110; the resonance frequency fv is higher than the value fp0. This results in the absolute magnitude |Lp| of a value of the inductance Lp at the operating point, which corresponds to the operating frequency f0, becoming a value Lp 1 higher than the reference value Lp0 (see FIG. 3), so that the reactance Xp of the power transmission coil 112 of each of the second to Nth power transmission units 105 at the operating frequency f0 becomes an adjusted value higher than the reference value Xp0 (see FIG. 1).

The adjusted value of the reactance Xp of the power transmission coil 112 of each of the second to Nth power transmission units 105 at the operating frequency f0, which is higher than the reference value Xp0, increases the input impedance Zp up to a value higher than the relatively low value Zp0 for the first power transmission coil 112 over which the power receiving coil 212 is located. This therefore enables the restricted current, which has a level lower than the relatively high level Ip0, to be supplied to the power transmission coil 112 of each of the second to Nth power transmission units 105. This therefore results in a reduction in unnecessary power consumption by the resonant power transmission circuit 110 of each of the remaining second to Nth power transmission units 105 over which no power receiving coil 212 is located, a reduction in leakage magnetic flux, and an improvement of the power transfer efficiency.

The first power transmission unit 105 is configured such that the power transmission coil 112 of the resonant power transmission circuit 110 is located to be magnetically coupled to the power receiving coil 212 of the power receiving apparatus 200. The resonant power transmission circuit 110 of the first power transmission unit 105 magnetically resonates with the resonant power receiving circuit 210, so that the input impedance Zp of the resonant power receiving circuit 110 becomes the relatively low value Zp0.

In contrast, each of the second to Nth power transmission units 105 is configured such that the power transmission coil 112 of the resonant power transmission circuit 110 is located not to be magnetically coupled to the power receiving coil 212 of the power receiving apparatus 200. The resonant power transmission circuit 110 of each of the second to Nth power transmission units 105 is magnetically non-resonant with the resonant power receiving circuit 210, so that the input impedance Zp of the resonant power receiving circuit 110 becomes to be higher than the relatively low value Zp0.

The above configuration of the first to Nth power transmission units 105 enables the drive current Ip0, which has the relatively high level Ip0, to be supplied as the output current Ip from the power output circuit 130 to the first power transmission coil 112 to which the power receiving coil 212 is magnetically coupled.

The above configuration of the first to Nth power transmission units 105 also increases the input impedance Zp of each of the remaining second to Nth power transmission units 105, whose power transmission coils 112 is not magnetically coupled to the power receiving coil 212, up to a value higher than the relatively low value Zp0. This therefore enables the restricted current, which has a level lower than the relatively high level Ip0, to be supplied from the power output circuit 130 to the power transmission coil 112 of each of the second to Nth power transmission units 105.

Specifically, the wireless power transfer apparatus 100 of the first embodiment, whose single power output circuit 130 is configured to drive the resonant power transmission circuits 110 of the respective power transmission units 105 connected in parallel to each other, makes it possible to reduce (1) Unnecessary power consumption by the power transmission coils 112 of the remaining second to Nth power transmission units 105, which do not contribute to power transfer (2) Leakage magnetic flux from the power transmission coils 112 of the remaining second to Nth power transmission units 105

Additionally, the wireless power transfer apparatus 100 of the first embodiment is configured to control, without using conventional current control elements connected in series to the respective power transmission coils, both (i) the transfer of a current from the power output circuit 130 to the first power transmission unit 105 selected to operate in a power transfer mode and (ii) the restriction of a current from the power output circuit to each of the second to Nth power transmission units 105 selected to operate in a power non-transfer mode.

Figure 4:
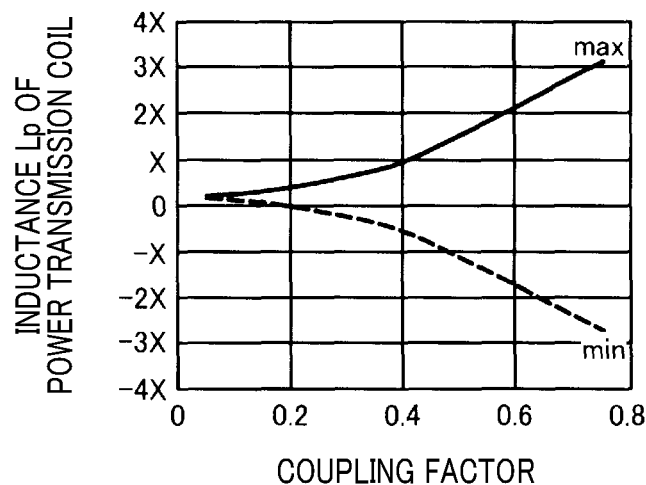
FIG. 4 is a graph illustrating how a characteristic variable range of an inductance of the power transmission coil changes depending on a coupling factor between the power transmission coil and the paired characteristic adjustment coil.

FIG. 4 illustrates a relationship between (i) values of the characteristic variable range of the inductance Lp, which varies with frequency, of the power transmission coil 112 and (ii) corresponding values of the coupling factor between the power transmission coil 112 and the paired characteristic adjustment coil 122. For each value of the coupling factor, a corresponding value of the characteristic variable range of the inductance Lp is defined as the difference between a corresponding maximum value and a corresponding minimum value of the inductance Lp (see FIG. 3).

FIG. 4 shows that the characteristic variable range of the inductance Lp increases with an increase in the coupling factor. The inductance Lp, i.e., the reactance Xp, of each of the second to Nth power transmission coils 112, which do not contribute to power transfer, can be set to be higher as the characteristic variable range of the inductance Lp of the corresponding one of the second to Nth power transmission coils 112 becomes larger. This therefore makes it possible to increase the input impedance Zp of each of the resonant power transmission circuits 110 of the second to Nth power transmission units 105, which do not contribute to power transfer, resulting in a restriction of the level of a current flowing through each of the second to Nth power transmission coils 112.

The above features make clear that the characteristic adjustment coil 122 of each characteristic adjuster 120 is preferably designed to have a possibly large value of the coupling factor with the corresponding paired power transmission coil 112. For example, the characteristic adjustment coil 122 of each characteristic adjuster 120 is preferably located as close as possible to the corresponding paired power transmission coil 112. Additionally, the characteristic adjustment coil 122 of each characteristic adjuster 120 is preferably located to be as coaxial as possible with the corresponding paired power transmission coil 112. The diameter of the characteristic adjustment coil 122 of each characteristic adjuster 120 is preferably identical to the diameter of the corresponding paired power transmission coil 112.

Figure 5:
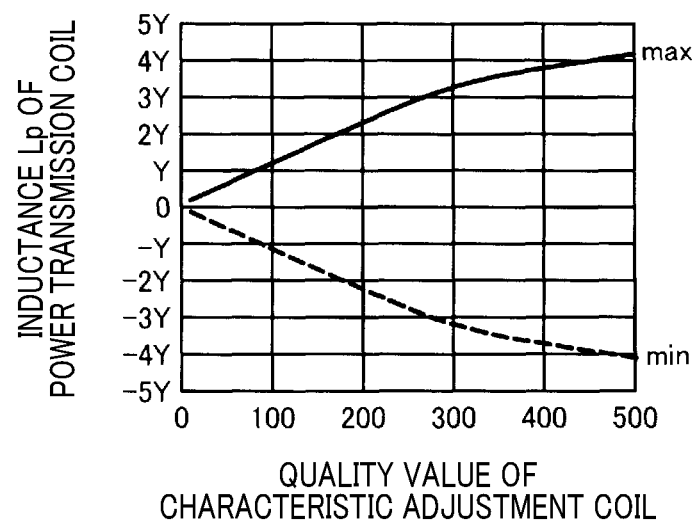
FIG. 5 is a graph illustrating how the characteristic variable range of the inductance of the power transmission coil changes depending on a quality factor of the paired characteristic adjustment coil.

FIG. 5 illustrates a relationship between (i) values of the characteristic variable range of the inductance Lp (see FIG. 3) of the power transmission coil 112 and (ii) corresponding values of the quality factor of the paired characteristic adjustment coil 122. FIG. 5 shows that the characteristic variable range of the inductance Lp of the power transmission coil 112 increases with an increase in the quality factor of the paired characteristic adjustment coil 122.

The above features make clear that the characteristic adjustment coil 122 of each characteristic adjuster 120 is preferably designed to have a possibly large value of the quality factor. For example, the characteristic adjustment coil 122 of each characteristic adjuster 120 is preferably designed as a core-type characteristic adjustment coil or designed to have as many turns as possible to accordingly have a as high self-inductance as possible. Additionally, the characteristic adjustment coil 122 of each characteristic adjuster 120 is preferably comprised of turns of a superior temperature and/or high-frequency characteristic copper wire, such as a litz wire. The characteristic adjustment coil 122 of each characteristic adjuster 120 preferably has as large cross-sectional area as possible and/or has as short axial length as possible.

Second Embodiment

Figure 6:
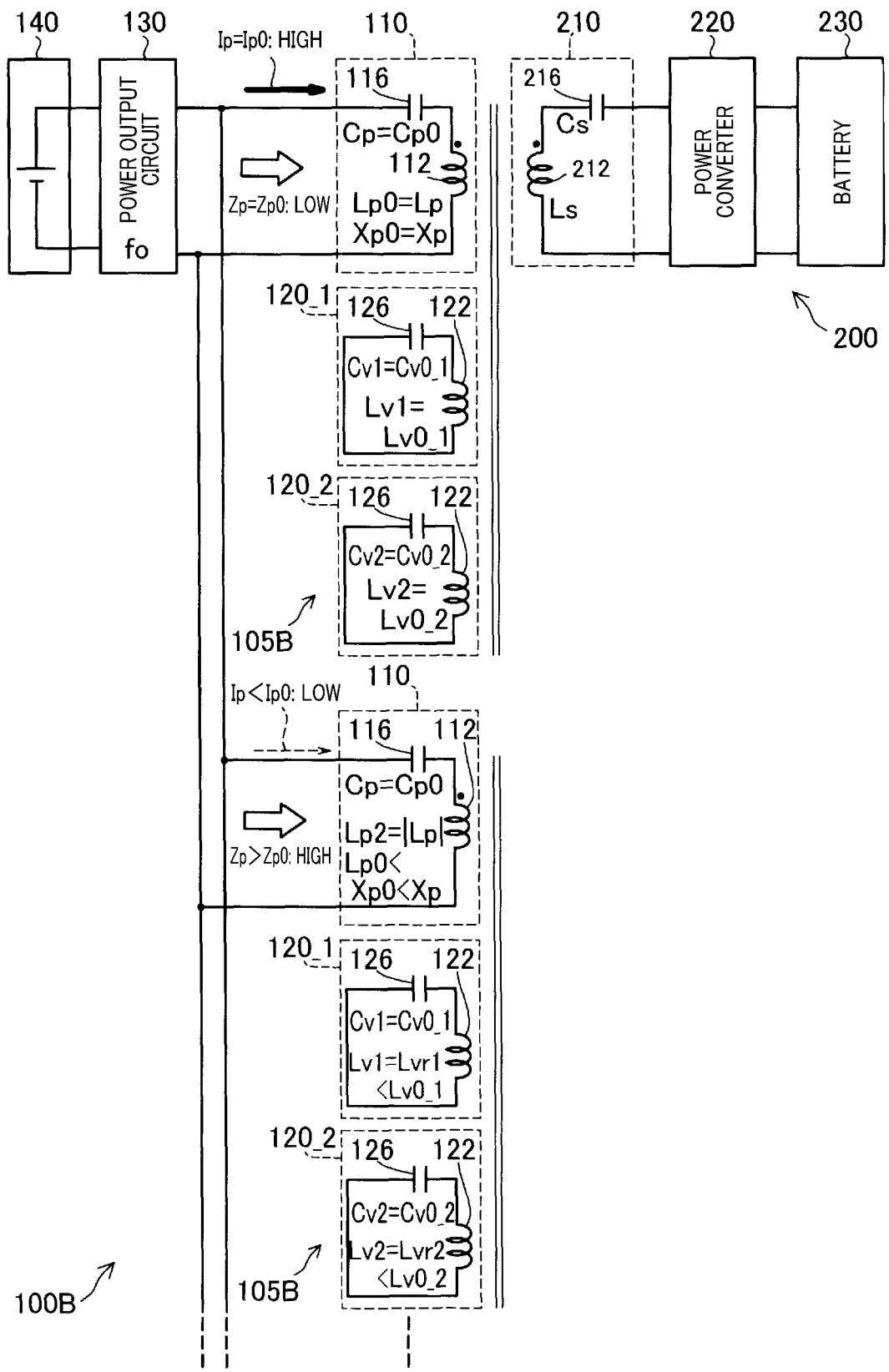
FIG. 6 is a circuit diagram of a wireless power transfer apparatus according to the second embodiment.

A wireless power transfer apparatus 100B according to the second embodiment illustrated in FIG. 6 includes first to Nth power transmission units 105B in place of the first to Nth power transmission units 105 of the wireless power transfer apparatus 100 illustrated in FIG. 1. Each power transmission unit 105B includes a plurality of, for example, first and second, characteristic adjusters 120_1 and 120_2, which is different from each power transmission unit 105.

Figure 7:
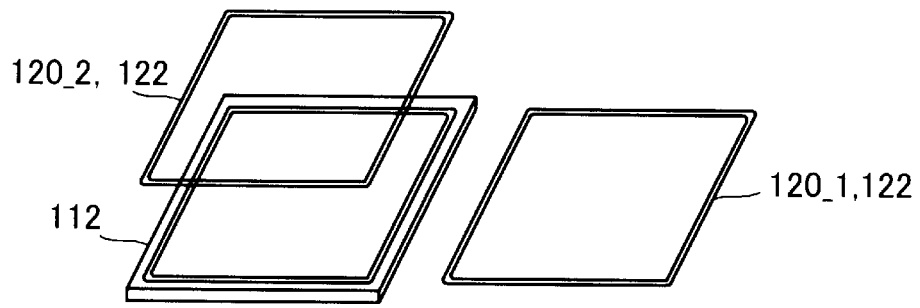
FIG. 7 is a view illustrating an example of the arrangement of a power transmission coil and two characteristic adjustment coils paired with the power transmission coil.

Like the first embodiment (see FIG. 2), the characteristic adjustment coil 122 of the first characteristic adjuster 120_1 is, as illustrated in FIG. 7, arranged to be lateral to the power transmission coil 112 of the paired resonant power transmission circuit 110. The characteristic adjustment coil 122 of the second characteristic adjuster 120_2 is, as illustrated in FIG. 7, arranged to face the power transmission coil 112 of the paired resonant power transmission circuit 110 in a vertical direction, and is magnetically coupled to the power transmission coil 112 of the paired resonant power transmission circuit 110.

This arrangement of the characteristic adjustment coils 122 of the first and second characteristic adjusters 120_1 and 120_2 with respect to the power transmission coil 112 of the paired resonant power transmission circuit 110 results in (i) The characteristic adjustment coil 122 of the first characteristic adjuster 120_1 having additive coupling to the power transmission coil 112 of the paired resonant power transmission circuit 110

(ii) The characteristic adjustment coil 122 of the second characteristic adjuster 120_2 having differential coupling to the power transmission coil 112 of the paired resonant power transmission circuit 110

In other words, the characteristic adjustment coil 122 of the first characteristic adjuster 120_1 has a positive value of the coupling factor with the power transmission coil 112 of the paired resonant power transmission circuit 110, and the characteristic adjustment coil 122 of the second characteristic adjuster 120_2 has a negative value of the coupling factor with the power transmission coil 112 of the paired resonant power transmission circuit 110

Figure 8:
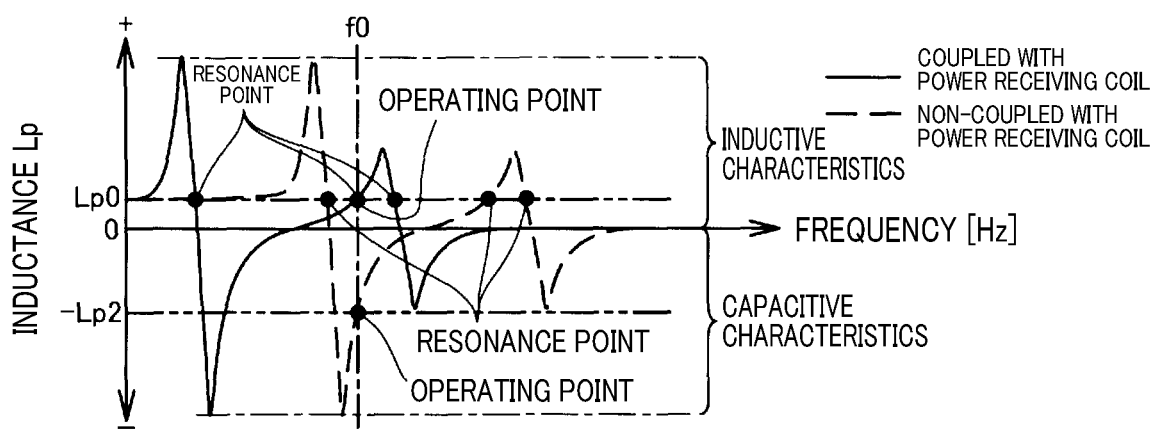
FIG. 8 is a graph illustrating frequency characteristic curves of the power transmission coil.

The inductance Lp of the power transmission coil 11 of each power transmission unit 105B has frequency characteristics that vary with frequency as illustrated by a solid curve and a dashed curve in FIG. 8 if the first and second characteristic adjusters 120_1 and 120_2 are provided to be paired with the power transmission coil 11.

Like the frequency characteristics of the inductance Lp of each power transmission coil 112 according to the first embodiment (see FIG. 3), the frequency characteristic curve of the inductance Lp of each power transmission coil 112 if the power receiving coil 212 is located over the corresponding power transmission coil 112 according to the second embodiment is shifted to the low frequency side as compared with that if no power receiving coil 212 is located over the corresponding power transmission coil 112.

From the above viewpoints, like the first embodiment, each of the resonant power transmission circuits 110 and first and second characteristic adjustment circuits 120_1 and 120_2 according to the second embodiment is configured such that the circuit constants of the corresponding one of the resonant power transmission circuits 110 and first and second characteristic adjustment circuits 120_1 and 120_2 are individually set to respective adjusted values (see FIG. 6).

Specifically, the reference value of the inductance Lp of the power transmission coil 112 of each resonant power transmission circuit 110 is set to the value Lp0, and the reference value of the capacitance Cp of the resonant capacitor 116 of each resonant power transmission circuit 110 is set to the value Cp0. The reactance Xp of each power transmission coil 112 at the operating frequency f0 is set to the value Xp0.

The characteristic adjustment coil 122 and the characteristic adjustment capacitor 126 of the first characteristic adjuster 120_1 respectively have an inductance Lv1 and a capacitance Cv1. Similarly, the characteristic adjustment coil 122 and the characteristic adjustment capacitor 126 of the second characteristic adjuster 120_2 respectively have an inductance Lv2 and a capacitance Cv2. A reference value of the inductance Lv1 of the characteristic adjustment coil 122 and a reference value of the capacitance Cv1 of the characteristic adjustment capacitor 126 of each first characteristic adjuster 120_1 are respectively set to values Lvr1 and Cv1. The reference value Lvr1 of the inductance Lv1 of the characteristic adjustment coil 122 is set to be lower than a predetermined value Lv0_1, and the reference value Cv1 of capacitance Cv1 of the characteristic adjustment capacitor 126 is set to be substantially equal to a predetermined value Cv0_1.

Similarly, a reference value of the inductance Lv2 of the characteristic adjustment coil 122 and a reference value of the capacitance Cv2 of the characteristic adjustment capacitor 126 of each second characteristic adjuster 120_2 are respectively set to values Lvr2 and Cv2. The reference value Lvr2 of the inductance Lv2 of the characteristic adjustment coil 122 is set to be lower than a predetermined value Lv0_2, and the reference value Cv2 of capacitance Cv2 of the characteristic adjustment capacitor 126 is set to be substantially equal to a predetermined value Cv0_2.

The predetermined value Lv0_1 of the inductance Lv1 of the characteristic adjustment coil 122 and the predetermined value Cv0_1 of the capacitance Cv1 of the characteristic adjustment capacitor 126 of the first characteristic adjuster 120_1 of the first power transmission unit 105B over which the power receiving coil 122 is located enable the resonance frequency of the paired power transmission circuit 110 becomes the operating frequency f0.

Similarly, the predetermined value Lv0_2 of the inductance Lv2 of the characteristic adjustment coil 122 and the predetermined value Cv0_2 of the capacitance Cv2 of the characteristic adjustment capacitor 126 of the second characteristic adjuster 120_2 of the first power transmission unit 105B over which the power receiving coil 122 is located enable the resonance frequency of the paired power transmission circuit 110 becomes the operating frequency f0.

Adjusting the circuit constants of each of the resonant power transmission circuits 110 and first and second characteristic adjusters 120_1 and 120_2 to the proper values set forth above enables the inductance Lp of the first power transmission coil 112 of the first power transmission unit 105B over which the power receiving coil 212 is located to become, as illustrated by the solid curve in FIG. 8, the reference value Lp0 that causes the resonance frequency fp of the resonant power transmission circuit 110 to substantially become the operating frequency f0. This enables the drive current Ip0 at the operating frequency f0, which has the relatively high level Ip0, to be supplied as the output current Ip from the power output circuit 130 to the first power transmission coil 112.

In contrast, the frequency characteristic curve of the inductance Lp of the power transmission coil 112 included in each of the second to Nth power transmission units 105B over which no power receiving coil 212 is located is shifted to the high frequency side, as illustrated by the dashed curve in FIG. 8. This results in the inductance Lp at the operating point, which corresponds to the operating frequency f0, becoming a value −Lp2 whose absolute magnitude |Lp| is higher than the reference value Lp0 (see FIG. 8), so that the reactance value Xp of the power transmission coil 112 of each of the second to Nth power transmission units 105B at the operating frequency f0 becomes an adjusted value that is higher than the reference value Xp0 (see FIG. 6).

This therefore enables the restricted current, which has a level lower than the relatively high level Ip0, to be supplied to the power transmission coil 112 of each of the second to Nth power transmission units 105B. This therefore results in a reduction in unnecessary power consumption by the resonant power transmission circuit 110 of each of the remaining second to Nth power transmission units 105B over which no power receiving coil 212 is located, a reduction in leakage magnetic flux, and an improvement of the power transfer efficiency.

As illustrated in FIG. 3, the inductance Lp of each of the second to Nth power transmission units 105 over which no power receiving coil 212 is located according to the first embodiment is set to a value positively higher than the value Lp0 at the resonance point of the paired resonant power transmission circuit 110. In other words, the inductance Lp of each of the second to Nth power transmission units 105 over which no power receiving coil 212 is located according to the first embodiment is set to an inductive characteristic value.

In contrast, as illustrated in FIG. 8, the inductance Lp of each of the second to Nth power transmission units 105B over which no power receiving coil 212 is located according to the second embodiment is set to a capacitive characteristic value.

Additionally, adjusting (i) the arrangement of the first and second characteristic adjusters 120_1 and 120_2 and (ii) the circuit constants of each of the first and second characteristic adjusters 120_1 and 120_2 enable adjustment of the shift amount of the frequency characteristic curve of the inductance Lp of the power transmission coil 112 included in each of the first to Nth power transmission units 105B, which depends on whether the power receiving coil 212 is located over the power transmission coil 112. This therefore makes it possible to set the inductance Lp of each of the second to Nth power transmission coils 112 over which no power receiving coil 212 is located to any one of an inductive characteristic value and a capacitive characteristic value. This enables expansion of the setting range of each of the second to Nth power transmission coils 112 over which no power receiving coil 212 is located.

The inductance Lp of each power transmission coil 112 has two resonance frequencies, i.e., two resonance points, based on the composite frequency characteristics; the composite frequency characteristics are the synthesis of (i) the frequency characteristics of the impedance of the first characteristic adjuster 120_1 and (ii) the frequency characteristics of the impedance of the second characteristic adjuster 120_2; the first and second characteristic adjusters 120_1 and 120_2 are paired with the corresponding power transmission coil 112.

The frequency characteristics of inductance Lp of each of the first to Nth power transmission coils 112 vary depending on the following matters:

(1) How the circuit constants of the first and second characteristic adjusters 120_1 and 120_2, which are paired with the corresponding one of the first to Nth power transmission coils 112, are set.

(2) How the corresponding one of the first to Nth power transmission coils 112 are arranged and coupled to the characteristic adjustment coils 122, which are paired with the corresponding one of the first to Nth power transmission coils 112.

From the above viewpoints, arrangement of the characteristic adjustment coils 122 of the respective first and second characteristic adjusters 120_1 and 120_2 relative to the paired power transmission coil 112 is not limited to the arrangement illustrated in FIG. 7.

That is, the characteristic adjustment coils 122 of the respective first and second characteristic adjusters 120_1 and 120_2 can be freely arranged relative to the paired power transmission coil 112 as long as (I) The characteristic adjustment coils 122 are magnetically coupled to the paired power transmission coil 112

(II) The coupling factors between each characteristic adjustment coil 122 and the paired power transmission coil 112 and the coupling factor between the characteristic adjustment coils 122 enable the paired power transmission coil 122 to have desired frequency characteristics As the plural characteristic adjusters, three or more characteristic adjusters can be used.

It is preferable that the characteristic adjustment coil 122 of at least one of the plural characteristic adjusters has differential coupling, i.e., a negative value of the coupling factor, with the paired power transmission coil 112, and at least one of the remaining characteristic adjusters has additive coupling, i.e., a positive value of the coupling factor, with the paired power transmission coil 112. This enables the frequency characteristics of the inductance Lp of each power transmission coil 112 to have two resonance frequencies, i.e., two resonance points, making it possible to set the inductance Lp of each power transmission coil 112 to any one of an inductive characteristic value and a capacitive characteristic value. This therefore enables expansion of the setting range of each power transmission coil 112.

In general, the inductance Lp of each power transmission coil 112 has, as described above, plural resonance frequencies, i.e., plural resonance points, based on the composite frequency characteristics; the composite frequency characteristics are the synthesis of the frequency characteristics of the impedances of the respective plural characteristic adjusters; the plural characteristic adjusters are paired with the corresponding power transmission coil 112.

The frequency characteristics of the respective plural characteristic adjusters are determined based on their resonance frequencies. For this reason, the resonance frequencies of the frequency characteristics of the plural characteristic adjusters are preferably set to be different from one another. This determination therefore enables the frequency characteristics of the inductance Lp of each power transmission coil 112 to have plural resonance frequencies, i.e., plural resonance points, making it possible to set the inductance Lp of each power transmission coil 112 to any one of an inductive characteristic value and a capacitive characteristic value. This therefore enables expansion of the setting range of each power transmission coil 112.

Like the first embodiment, the characteristic adjustment coil 122 of each of the plural characteristic adjusters is preferably designed to have a possibly large value of the coupling factor with the corresponding paired power transmission coil 112, and have a possibly large value of the quality factor.

Third Embodiment

Figure 9:
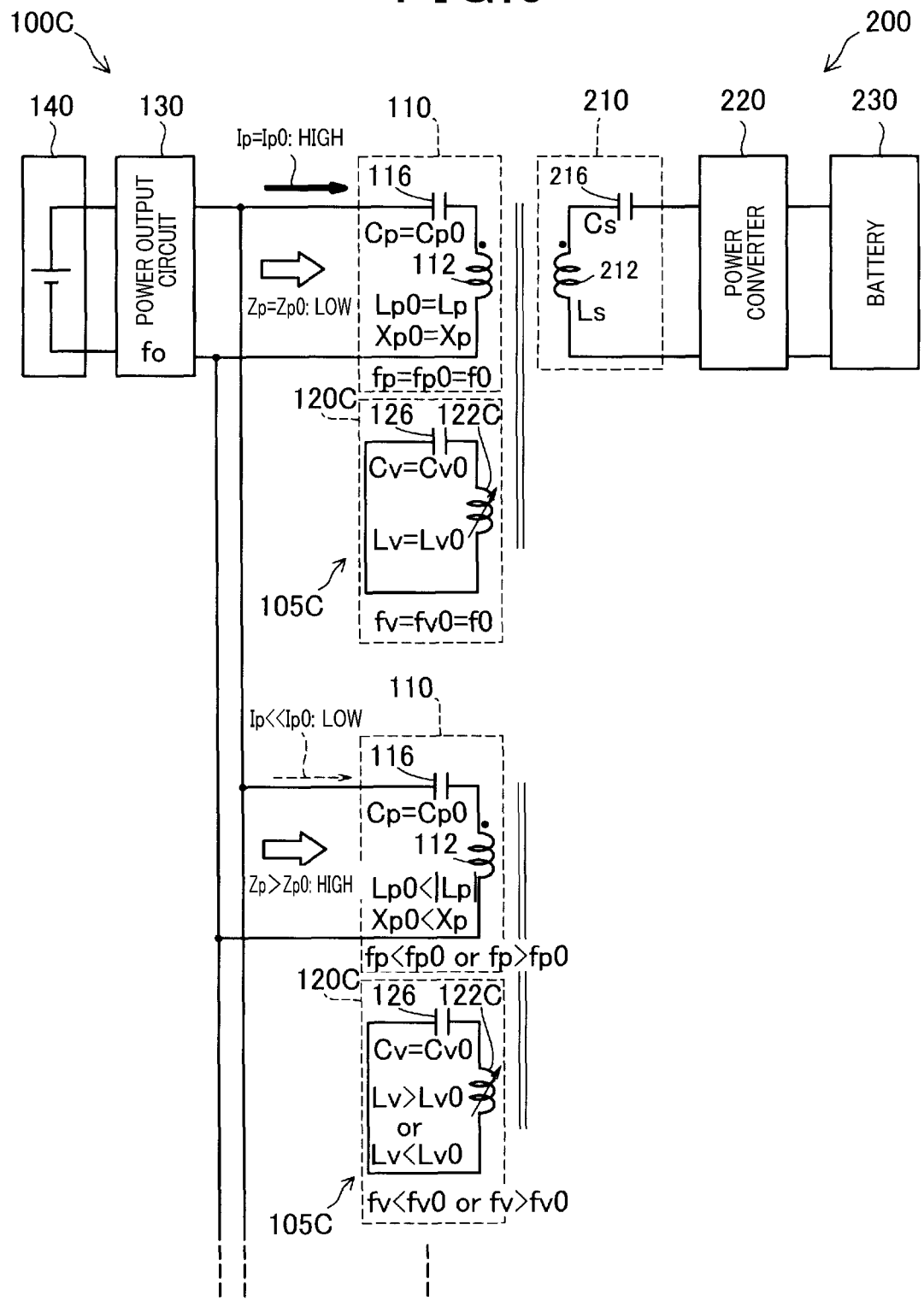
FIG. 9 is a circuit diagram of a wireless power transfer apparatus according to the third embodiment.

A wireless power transfer apparatus 100C according to the third embodiment illustrated in FIG. 9 includes first to Nth power transmission units 105C in place of the first to Nth power transmission units 105 of the wireless power transfer apparatus 100 illustrated in FIG. 1. Each power transmission unit 105C includes a characteristic adjuster 120C, which is different from the characteristic adjuster 120 of the corresponding power transmission unit 105.

The characteristic adjuster 120C of each power transmission unit 105C is comprised of a characteristic adjustment coil 122C in place of the characteristic adjustment coil 122. A variable inductance inductor is used as the characteristic adjustment coil 122C.

The reference value of the inductance Lp of the power transmission coil 112 of each resonant power transmission circuit 110 is set to the value Lp0, and the reference value of the capacitance Cp of the resonant capacitor 116 of each resonant power transmission circuit 110 is set to the value Cp0. The reactance Xp of each power transmission coil 112 at the operating frequency f0 is set to the value Xp0.

The characteristic adjustment capacitor 126 of each characteristic adjuster 120C has a capacitance Cv. The reference value Cvr of the capacitance Cv of each characteristic adjustment capacitor 126 of the characteristic adjuster 120C is set to the capacitance value Cv0 set forth above.

The characteristic adjustment inductor 122C of each characteristic adjuster 120C has an inductance Lv. How the inductance Lv of the characteristic adjustment inductor 122C of each characteristic adjuster 120C is determined as follows.

The inductance Lp of the first power transmission coil 112 over which the power receiving coil 212 is located becomes zero (Lp=0), and the inductance Lv of the characteristic adjustment coil 122C paired with the first power transmission coil 112 is set to the reference value LW that enables the resonance frequency fv of the characteristic adjuster 120C to be set to the value fv0 that substantially matches the operating frequency f0.

In contrast, the inductance Lv of the characteristic adjustment coil 122C of each of the second to Nth power transmission units 105C over which no power receiving coil 212 is located is set to be lower or higher than the reference value LW; this setting enables the resonance frequency fv of each of the second to Nth power transmission units 105C to become higher or lower than the value fv0 that substantially matches the operating frequency f0.

Adjustment of values of the above respective parameters of the characteristic adjustment coil 122C of each power transmission unit 105C can be carried out based on information indicative of whether the power receiving coil 212 of the power receiving apparatus 200 is located over the power transmission coil of the corresponding power transmission unit 105C; the information is detected by, for example, an object detection sensor installed in the corresponding power transmission unit 105C.

Figure 10:
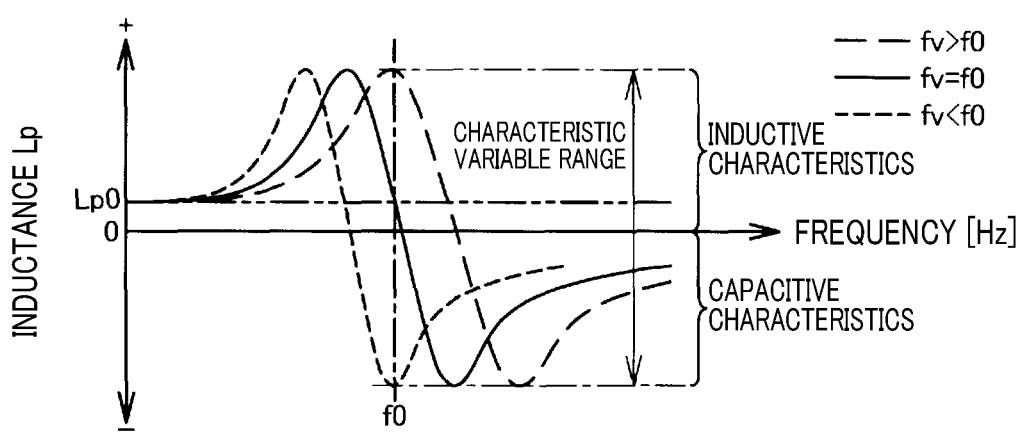
FIG. 10 is a graph illustrating frequency characteristic curves of the power transmission coil.

FIG. 10 shows that adjusting the resonance frequency fv of each of the second to Nth power transmission units 105C to be higher than the value fv0 that substantially matches the operating frequency f0 enables the characteristic curve of the inductance Lp of the corresponding power transmission coil 112 to be shifted toward a higher side, resulting in the value of the inductance Lp at the operating frequency f0 becoming an inductive characteristic value higher than the reference value Lp0.

In contrast, FIG. 10 shows that adjusting the resonance frequency fv of each of the second to Nth power transmission units 105C to be lower than the value fv0 that substantially matches the operating frequency f0 enables the characteristic curve of the inductance Lp of the corresponding power transmission coil 112 to be shifted toward a lower side.

This leads to (i) the value of the inductance Lp at the operating frequency f0 becoming an inductive characteristic value higher than the reference value Lp0, and (ii) the absolute magnitude |Lp| of the inductance Lp at the operating frequency f0 becoming higher than the reference value Lp0, resulting in the reactance Xp of the power transmission coil 112 of each of the second to Nth power transmission units 105C at the operating frequency f0 becoming an adjusted value that is higher than the reference value Xp0 (Xp<Xp0).

Adjusting the inductance Lv of the characteristic adjustment coil 122C of each of the second to Nth power transmission units 105C over which no power receiving coil 212 is located to be lower or higher than the reference value LW enables the resonance frequency fv of each of the second to Nth power transmission units 105C to become higher or lower than the value fv0 that substantially matches the operating frequency f0. This therefore makes it possible to set the inductance Lp of each of the second to Nth power transmission coils 112 over which no power receiving coil 212 is located to any one of an inductive characteristic value and a capacitive characteristic value. This enables expansion of the setting range of each of the second to Nth power transmission coils 112 over which no power receiving coil 212 is located.

The third embodiment is configured to adjust the variable inductance of the variable inductance inductor, which is used as the characteristic adjustment coil, of each characteristic adjuster to thereby adjust the resonance frequency of the corresponding characteristic adjuster. The present disclosure is however not limited to the description.

Specifically, the third embodiment can be configured to adjust a variable capacitance of a variable capacitance capacitor, which is used as the characteristic adjustment capacitor, of each characteristic adjuster to thereby adjust the resonance frequency of the corresponding characteristic adjuster.

Like each of the above first and second embodiments, the characteristic adjustment coil 122C of each of the plural characteristic adjusters is preferably designed to have a possibly large value of the coupling factor with the corresponding paired power transmission coil 112, and have a possibly large value of the quality factor.

Fourth Embodiment

The wireless power transfer apparatus 100 according to the first embodiment illustrated in FIG. 1 can be applied as a wireless power transfer apparatus 100D according to the fourth embodiment; the wireless power transfer apparatus 100D constitutes a vehicular wireless power transfer system.

Figure 11:
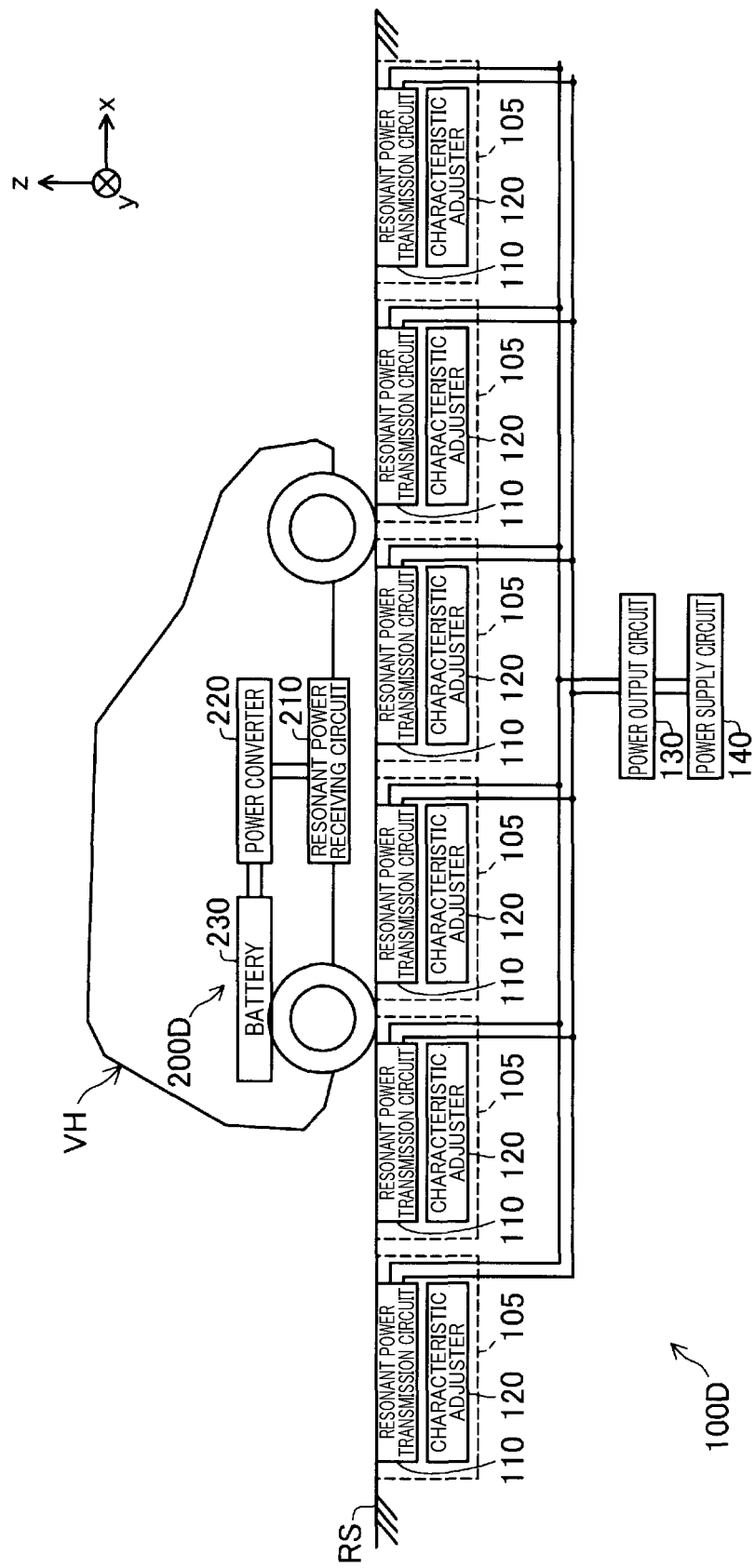
FIG. 11 is a schematic functional diagram of a vehicular wireless power transfer apparatus to which the wireless power transfer apparatus of the first embodiment has been applied.

The vehicular wireless power transfer system illustrated in FIG. 11 is configured such that the wireless power transfer apparatus 100D laid along a vehicular travel road RS enables supply of electrical power to a power receiving apparatus 200D installed in a vehicle VH.

Like the wireless power transfer apparatus 100 (see FIG. 1), the wireless power transfer apparatus 100D includes the power transmission units 105, the power output circuit 130, and the power supply circuit 140. The power supply circuit 140 supplies DC power to the power output circuit 130, and the power output circuit 130 supplies AC power based on the supplied DC power to each of the power transmission units 105.

Each power transmission unit 105 includes the resonant power transmission circuit 110 and the characteristic adjuster 120.

Each resonant power transmission circuit 110 includes the power transmission coil 112 laid on the vehicular travel road RS, and the resonant capacitor 116 (see FIG. 1); the components 112 and 116 are not illustrated in FIG. 11. The power transmission coils 112 of the resonant power transmission circuits 110 are successively laid along the vehicular travel road RS.

In FIG. 11, an X direction represents a first horizontal direction in which the power transmission coils 112 of the resonant power transmission circuits 110 are aligned, a Y direction represents a second horizontal direction perpendicular to the first horizontal direction, and a Z direction represents an upper direction perpendicular to the X and Y directions.

Like the power receiving apparatus 200 (see FIG. 1), the power receiving apparatus 200D installed in the vehicle VH includes the resonant power receiving circuit 210, the power converter 220, and the battery 230.

The resonant power receiving circuit 210 includes the power receiving coil 212 and the resonant capacitor 216 (see FIG. 1). At least the power receiving coil 212 is disposed on the bottom of the vehicle VH and arranged to face the power transmission coil 112 (see FIG. 1) of at least one resonant power transmission circuit 110 laid along the vehicular travel road RS.

The power converter circuit 220 is configured to convert AC power obtained by the resonant power receiving circuit 210 into DC power, and charge the battery 230, which serves as a load, using the DC power. The DC power charged in the battery 230 is used to drive electrical apparatuses, such as one or more unillustrated motors.

The wireless power transfer apparatus 100D, which constitutes the vehicular wireless power transfer system, achieves the same advantageous benefits as described in the first embodiment.

The wireless power transfer apparatus 100B of the second embodiment (see FIG. 6) or the wireless power transfer apparatus 100C of the third embodiment (see FIG. 9) can be used as a wireless power transfer apparatus constituting a vehicular wireless power transfer system.

Modifications

The wireless power transfer apparatus according to each embodiment includes the plurality of resonant power transmission circuits, but wireless power transfer apparatuses according to the present disclosure can be modified to include a single resonant power transmission circuit. This configuration of each modified wireless power transfer apparatus also enables reduction in unnecessary power consumption by one or more power transmission coils that do not contribute to power transfer, and reduction in leakage magnetic flux. This configuration of each modified wireless power transfer apparatus additionally enables control, without using conventional current control elements connected in series to the respective power transmission coils, both (i) The transfer of a current from the power output circuit to at least one power transmission unit selected to operate in a power transfer mode (ii) The restriction of a current from the power output circuit to each of the remaining one or more power transmission units selected to operate in a power non-transfer mode Each embodiment employs the resonant power transmission circuits and the resonant power receiving circuit, each of which is designed to use series resonance, but each of the resonant power transmission circuits and the resonant power receiving circuit can be designed to use parallel resonance. One of the resonant power transmission circuits and the resonant power receiving circuit can be designed to use series resonance, and the other thereof can be designed to use parallel resonance.

That is, the technologies described in each embodiment can be applied to not only parallel resonant apparatuses but also series resonant apparatuses, making it possible to offer the technologies described in each embodiment, which have more general applicability.

Each power transmission coil 112 according to each embodiment is comprised of a single-phase coil, and the power receiving coil 212 according to each embodiment is also comprised of a single-phase coil, but each power transmission coil 112 can be comprised of multi-phase coils, or the power receiving coil 212 can be comprised of multi-phase coils. For example, each power transmission coil 112 can be comprised of a single-phase coil, and the power receiving coil 212 can be comprised of two or more-phase coils. Alternatively, each power transmission coil 112 can be comprised of two or more-phase coils, and the power receiving coil 212 can be comprised of a single-phase coil or multi-phase coils.

The characteristic adjuster of each power transmission unit according to each embodiment includes a characteristic adjustment capacitor as an independent component, but the characteristic adjuster of each power transmission unit according to the present disclosure can use a floating capacitance of the corresponding characteristic adjustment coil as a characteristic adjustment capacitor.

The present disclosure is not limited to the above embodiments, and is freely modified as various embodiments within the scope of the subject matter of the present disclosure.

For example, technical features described in the above embodiments, which corresponds to at least one technical feature of the above exemplary aspect of the present disclosure described in the SUMMARY can be replaced with other features or combined with each other for solving a part or whole of the above problem. At least one of the technical features described in the above embodiments, which has not been explained in the present specification as an essential feature, can be freely eliminated.

What is claimed is:

1. A wireless power transfer apparatus for wirelessly transferring electrical power to a power receiving apparatus, the wireless power transfer apparatus comprising:
    a power output circuit configured to output alternating-current power having a predetermined operating frequency;
    at least one power transmission unit configured to transmit the alternating-current power to the power receiving apparatus, the at least one power transmission unit comprising:
        a resonant power transmission circuit that includes a power transmission coil, which has a reactance, and a resonant capacitor; and
        at least one characteristic adjuster configured as a closed loop and that comprises:
            a characteristic adjustment coil magnetically coupled to the power transmission coil without being connected in series to the power transmission coil; and
            a characteristic adjustment capacitor connected to the characteristic adjustment coil, wherein
    the at least one characteristic adjuster has a frequency characteristic that:
        causes, in a power transfer mode from the at least one power transmission unit to the power receiving apparatus in which the power transmission coil is magnetically coupled to a power receiving coil of the power receiving apparatus, the resonant power transmission circuit to have a resonance frequency that substantially matches the operating frequency, the reactance of the power transmission coil having a reference value in the power transfer mode; and
        causes, in a power non-transfer mode from the at least one power transmission unit to the power receiving apparatus in which the power transmission coil is not magnetically coupled to the power receiving coil, the reactance of the power transmission coil to become an adjusted value that is higher than the reference value, and
    the frequency characteristic of the at least one characteristic adjuster changes based on a change between:
        a first state of magnetic coupling between the power transmission coil and the power receiving coil in the power transfer mode; and
        a second state of non-magnetic coupling between the power transmission coil and the power receiving coil in the power non-transfer mode.

2. The wireless power transfer apparatus according to claim 1, wherein:
    the at least one power transmission unit comprises a plurality of power transmission units; and
    the plurality of power transmission units are connected in parallel to the power output circuit.

3. The wireless power transfer apparatus according to claim 1, wherein:
    the characteristic adjustment coil has an inductance;
    the characteristic adjustment capacitor has a capacitance; and
    adjustment of at least one of the inductance of the characteristic adjustment coil and the capacitance of the characteristic adjustment capacitor causes the frequency characteristic of the at least one characteristic adjuster to change.

4. The wireless power transfer apparatus according to claim 1, wherein:
    the at least one characteristic adjuster comprises at least a first characteristic adjuster and a second characteristic adjuster; and
    the power transmission coil has an inductance, the inductance of the power transmission coil having a frequency characteristic that enables the resonant power transmission circuit to have at least first and second resonance frequencies.

5. The wireless power transfer apparatus according to claim 4, wherein:
    the characteristic adjustment coil of one of the at least first and second characteristic adjusters has additive coupling to the power transmission coil; and
    the characteristic adjustment coil of the other of the at least first and second characteristic adjusters has differential coupling to the power transmission coil.

6. The wireless power transfer apparatus according to claim 4, wherein:
    the characteristic adjustment coil of one of the at least first and second characteristic adjusters is arranged to face the power transmission coil in a vertical direction; and
    the characteristic adjustment coil of the other of the at least first and second characteristic adjusters is arranged to be lateral to the power transmission coil in a horizontal direction.

7. The wireless power transfer apparatus according to claim 4, wherein:
    the at least first and second characteristic adjusters have resonance frequencies different from each other.

8. The wireless power transfer apparatus according to claim 1, wherein:
    the power transmission coil has an inductance; and
    the inductance of the power transmission coil has:
        a first frequency characteristic in the power transfer mode, the resonance frequency of the resonant power transmission circuit substantially matching the operating frequency in the first frequency characteristic; and
        a second frequency characteristic in the power non-transfer mode having one of an inductive characteristic value and a capacitive characteristic value at the operating frequency.

9. The wireless power transfer apparatus according to claim 1, wherein:
    the characteristic adjustment coil has a floating capacitance; and
    the floating capacitance serves as the characteristic adjustment capacitor of the at least one characteristic adjuster.

10. The wireless power transfer apparatus according to claim 1, wherein:
    the at least one power transmission unit comprises a plurality of power transmission units;
    the plurality of power transmission units are connected in parallel to the power output circuit;

the power transmission coil of a selected at least one power transmission unit in the plurality of power transmission units is magnetically coupled to the power receiving coil of the power receiving apparatus in the power transfer mode; and the power transmission coil of at least one remaining power transmission unit except the selected at least one power transmission unit in the plurality of power transmission units is in the power non-transfer mode so that the power transmission coil of the at least one remaining power transmission unit is not magnetically coupled to the power receiving coil of the power receiving apparatus, resulting in a value of the reactance of the power transmission coil of the at least one remaining power transmission unit being higher than a value of the reactance of the power transmission coil of the selected at least one power transmission unit.

\* \* \* \* \*